United States Patent
Pan et al.

(10) Patent No.: US 8,477,863 B2
(45) Date of Patent: Jul. 2, 2013

(54) PRECODED PILOT TRANSMISSION FOR MULTI-USER AND SINGLE USER MIMO COMMUNICATIONS

(75) Inventors: Kyle Jung-Lin Pan, Smithtown, NY (US); Allan Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 824 days.

(21) Appl. No.: 12/033,562

(22) Filed: Feb. 19, 2008

(65) Prior Publication Data

US 2008/0212702 A1 Sep. 4, 2008

Related U.S. Application Data

(60) Provisional application No. 60/890,271, filed on Feb. 16, 2007.

(51) Int. Cl.
*H04B 7/02* (2006.01)

(52) U.S. Cl.
USPC ........... 375/267; 375/260; 370/329; 370/335; 370/337; 370/343

(58) Field of Classification Search
USPC .................. 375/260, 267; 370/329, 335, 337, 370/343
See application file for complete search history.

(56) References Cited

U.S. PATENT DOCUMENTS

| | | | |
|---|---|---|---|
| 2007/0070944 A1* | 3/2007 | Rinne et al. | 370/329 |
| 2008/0108310 A1* | 5/2008 | Tong et al. | 455/69 |
| 2009/0016278 A1* | 1/2009 | Wakabayashi | 370/329 |
| 2009/0219838 A1* | 9/2009 | Jia et al. | 370/278 |

FOREIGN PATENT DOCUMENTS

| WO | 03/021795 | 3/2003 |
|---|---|---|
| WO | 2005/094023 | 10/2005 |
| WO | 2007/022630 | 3/2007 |

OTHER PUBLICATIONS

Ericsson et al., "E-UTRA Downlink Control Signaling—Overhead Assessment," TSG-RAN WG1 #44, R1-060573 (Feb. 13-17, 2006).
Motorola, "Proposal for Dedicated Pilots in Downlink Precoding for EUTRA MIMO," 3GPP TSG RAN WG1 Meeting #48,R1-070770 (Feb. 12-16, 2007).
Third Generation Partnership Project, "Technical Specification Group Radio Access Network; Evolved Universal Terrestrial Radio Access (E-UTRA); Physical Channels And Modulation (Release 8)", 3GPP TS 36.211 V8.1.0 (Nov. 2007).
Third Generation Partnership Project, "Technical Specification Group Radio Access Network; Evolved Universal Terrestrial Radio Access (E-UTRA); Physical Channels And Modulation (Release 8)", 3GPP TS 36.211 V0.3.1 (Feb. 2007).
Third Generation Partnership Project, "Technical Specification Group Radio Access Network; Physical layer procedures (Release 8)," 3GPP TS 36.213 V0.2.1 (Oct. 2006).

(Continued)

*Primary Examiner* — Daniel Washburn
*Assistant Examiner* — Eboni Hughes
(74) *Attorney, Agent, or Firm* — Volpe and Koenig, P.C.

(57) ABSTRACT

The disclosed method and apparatus include an WTRU-specific reference signal scheme that provides efficient precoded pilot transmission and effective channel estimation using dedicated pilot signals. The disclosed methods are efficient for both a single user (SU) and a multi user (MU) Multiple Input Multiple Output (MIMO) system.

9 Claims, 9 Drawing Sheets

OTHER PUBLICATIONS

Third Generation Partnership Project, "Technical Specification Group Radio Access Network; Evolved Universal Terrestrial Radio Access (E-UTRA); Physical layer procedures (Release 8)," 3GPP TS 36.213 V8.1.0 (Nov. 2007).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.0.0 (Dec. 2007).

* cited by examiner

PRECODED PILOT TRANSMISSION FOR MULTI-USER AND SINGLE USER MIMO COMMUNICATIONS

CROSS REFERENCE TO RELATED APPLICATIONS

This application claims the benefit of U.S. provisional application No. 60/890,271, filed Feb. 16, 2007, which is incorporated by reference as if fully set forth.

FIELD OF INVENTION

The present invention is related to wireless communication systems.

BACKGROUND

Third Generation Partnership Project (3GPP) and 3GPP2 are considering long term evolution (LTE) for radio interface and network architecture. Currently, receivers use a common reference signal for channel estimation, decide the precoding matrix based on the estimated common channel and feedback the information about the preceding matrix to the transmitter. The transmitter then uses the signaled precoding matrix and multiplies it with the data signal to be transmitted. Due to the feedback error the precoding matrix used by the transmitter may be different from the precoding matrix signaled from receiver. Also due to network flexibility, the transmitter may decide to use a different precoding matrix than the one that is signaled from receiver even if there is no feedback error. Therefore the information about the precoding matrix used by the transmitter has to be signaled to the receiver via control channel. The receiver is then able to decode the control channel to obtain the preceding information and use this precoding information to demodulate the precoded data signal.

Orthogonal frequency division multiplexing (OFDM) is a data transmission scheme where the data is split into smaller streams and each stream is transmitted using a sub-carrier with a smaller bandwidth than the total available transmission bandwidth. The efficiency of OFDM is a result of the fact that the sub-carriers are selected so that they are orthogonal to each other. In other words, the sub-carriers do not interfere with each other while each is carrying a portion of the total user data.

Multiple Input—Multiple Output Orthogonal Frequency Division Multiplexing (MIMO OFDM) and MIMO Single Carrier Frequency Division Multiplexing Access (SC-FDMA) are air interface technologies used for high data throughput (HT) services. Various forms of transmit beam-forming are currently being considered for these technologies, including eigen-beamforming, spatial multiplexing, and space time coding. Each of these techniques, though, requires channel state information to be available at the transmitter in order to enable the maximum achievable capacity. Because the amount of information required for feedback may be excessive for a practical system, methods to reduce the amount of required feedback have been developed. Methods for reducing feedback include codebook methods, phase quantization methods, open loop methods including channel sounding, and statistical prefiltering.

Efficient signaling of precoding information or antenna weights from the transmitter (NodeB) to the receiver (UE) are essential to multiple-input multiple-output (MIMO) system for evolved universal terrestrial radio access (E-UTRA), especially for both SU and MU MIMO using precoding or beamforming.

As such a method and apparatus are needed to provide efficient communications between transmitter and receiver for precoding information and antenna weights and improved effective channel estimation at the receiver (or UE).

SUMMARY

A method and apparatus includes an WTRU-specific reference signal scheme that provides efficient precoded pilot transmission and effective channel estimation using dedicated pilot signals. The method is efficient for both a single user (SU) and a multi user (MU) Multiple Input Multiple Output (MIMO) system.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
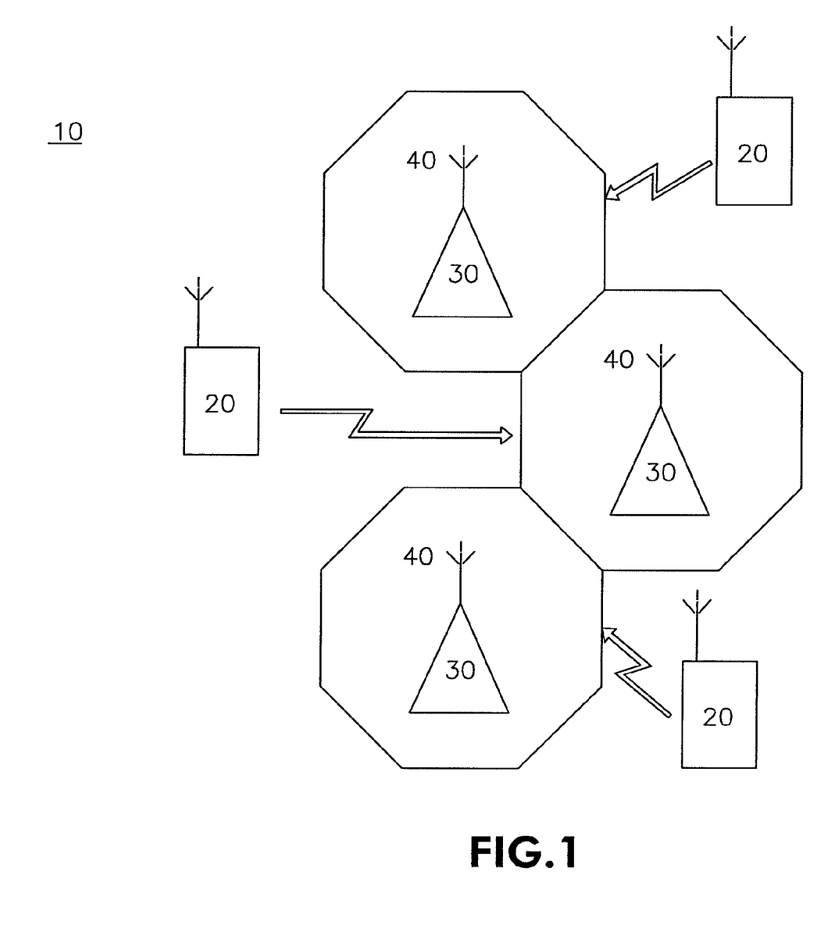
FIG. 1 shows an example block diagram of a wireless communication system.

Referring to FIG. 1, an LTE wireless communication network (NW) 10, for example, a multiple input multiple output (MIMO) system, comprises one or more WTRUs 20, one or more Node Bs 30, and one or more cells 40. Each cell 40 comprises one or more Node Bs (NB or eNB) 30.

Figure 2:
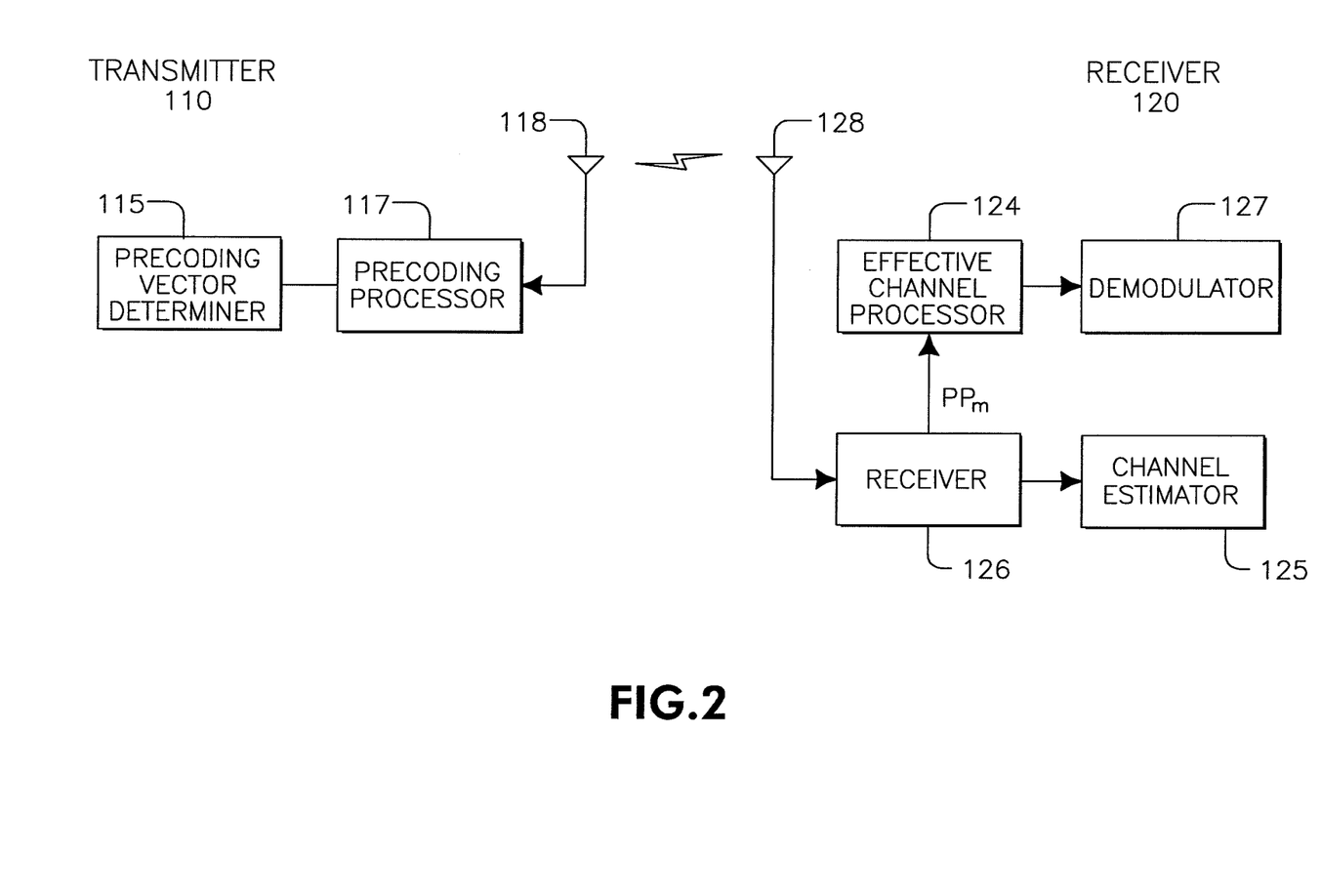
FIG. 2 shows an example block diagram of a transmitter and receiver configured to implement a precoding pilot transmission using a WTRU specific dedicated reference signal.

FIG. 2 is a functional block diagram of a transmitter 110 and receiver 120 configured to perform a method of preceding pilot transmissions using a WTRU specific dedicated reference signal. In addition to components included in a typical transmitter/receiver, transmitter 110 comprises a precoding vector determiner 115, a preceding processor 117, and an antenna array 118. Precoding determiner 115 coupled to precoding processor 117, determines a precoding vector to be used by transmitter 110 when transmitting a data transmission, for example, an orthogonal frequency division multiplexing (OFDM) symbols, to a receiver 120. Precoding processor 117, coupled to preceding determiner 115 and antenna array 118, precodes data symbols and a pilot signal, which is transmitted using WTRU specific dedicated reference signals, to be disclosed hereinafter.

Receiver 120 comprises a receiver 126, an effective channel processor 124, a channel estimator 125 and a demodulator 127. As disclosed in greater detail hereinafter, receiver 120 comprising receiver 126, receives a transmitted OFDM block from Node B 20, performs channel estimation by channel estimator 125, calculates an effective channel estimate using effective channel processor 124 and demodulates the received OFDM symbols using the effective channel estimation.

For purposes of this disclosure, Node B 30 comprises transmitter 110, and WTRU 20 comprises receiver 120. It should be noted though that transmitter 110 may be located at a WTRU or at a base station, and receiver 120 may be located at either the WTRU, base station, or both.

A method is disclosed wherein a WTRU-specific dedicated reference signal is used. The precoded pilot is transmitted using the WTRU dedicated reference signal (RS). In accordance with the disclosed method, channel estimator 125 of receiver 120 determines a precoding matrix or vector using the channel information obtained from received common reference signals within the received OFDM symbols, such as common pilot signal. The preceding matrix or vector is selected using a codebook for example, wherein channel estimator selects an indicator associated with the optimum precoding matrix or vector. The indicator, or index, is transmitted to transmitter 110.

As those having skill in the art know, the common reference signal is cell specific for all WTRUs within the cell receiving a signal transmitted from transmitter 110. It should be noted that although the term precoding vector is used throughout this disclosure, the receiver and transmitter may select and use a precoding matrix in the same manner.

Once transmitter 110 receives the indicator, precoding vector determiner 115 then selects the appropriate precoding vector, for example, from a codebook that is similar to the codebook used by receiver 120, using the received index. It should be noted that transmitter 110 may select a different precoding vector from the codebook other than that referenced by receiver 120.

In accordance with the disclosed method, transmitter 110 then precodes the data symbols using the selected precoding vector. The pilot is also precoded using the same precoding vector that is used by the data in the corresponding data stream or layer. For N antennas and M data streams or M layers, M≦N, there are M pilots, each of which is precoded using the corresponding precoding vector that has N elements. For example, in the case of M data streams or layers, M precoding vectors and thus M dedicated RSs are required. Therefore, M precoded pilots are used for M dedicated RSs.

Each precoded pilot is expressed by the following equation:

$$\vec{P}_{dedicated,m} = \begin{bmatrix} v_{m1} \\ v_{m2} \\ v_{m3} \\ v_{mN} \end{bmatrix} \cdot P_m \qquad \text{Equation (1)}$$

where m=1,2, . . . ,M. The vector $\vec{v}_m = [v_{m1}\ v_{m2}\ v_{m3}\ v_{mN}]^T$ is the precoding vector of the m-th data stream or layer. Therefore, the n-th element of the precoded pilot is equivalent to:

$$\vec{P}_{dedicated,m}(n) = v_{mn} P_m \qquad \text{Equation (2)}$$

Figure 3:
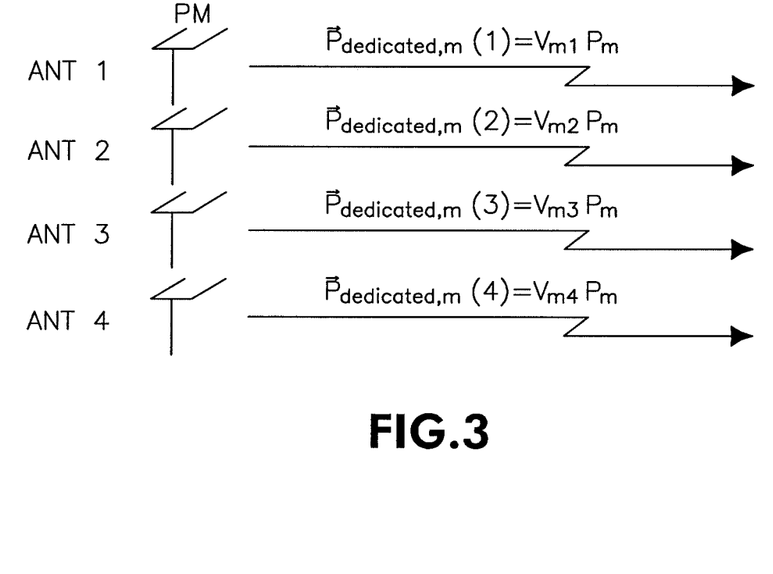
FIG. 3 shows dedicated pilots that are transmitted in different subcarriers in a precoded pilot transmission scheme using dedicated reference signals.
Figure 4:
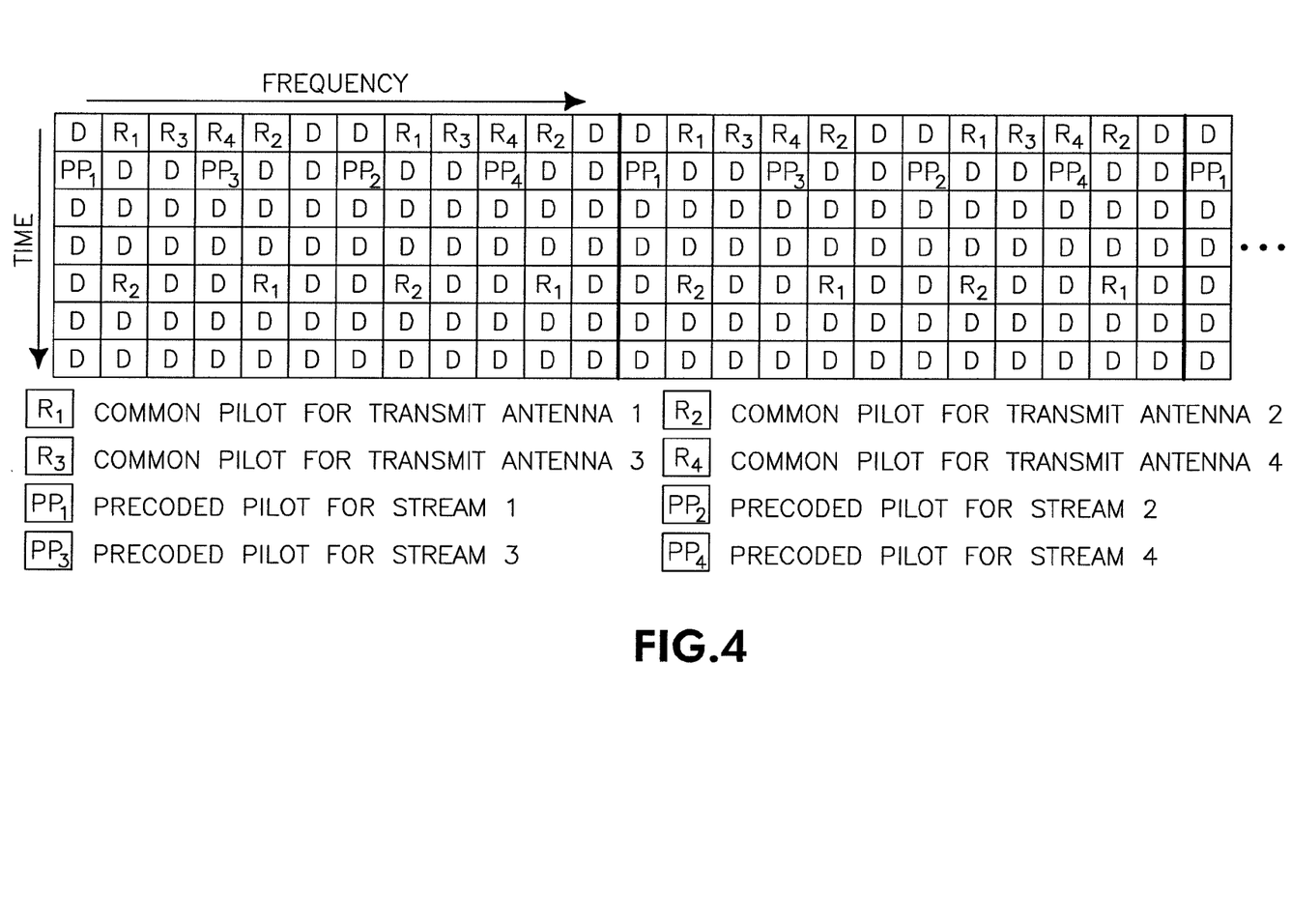
FIG. 4 shows an example layout of precoded pilot transmission using dedicated reference signals whereby precoded pilots are placed in different subcarriers but in the same orthogonal frequency division multiplexing (OFDM) symbol.
Figure 5:
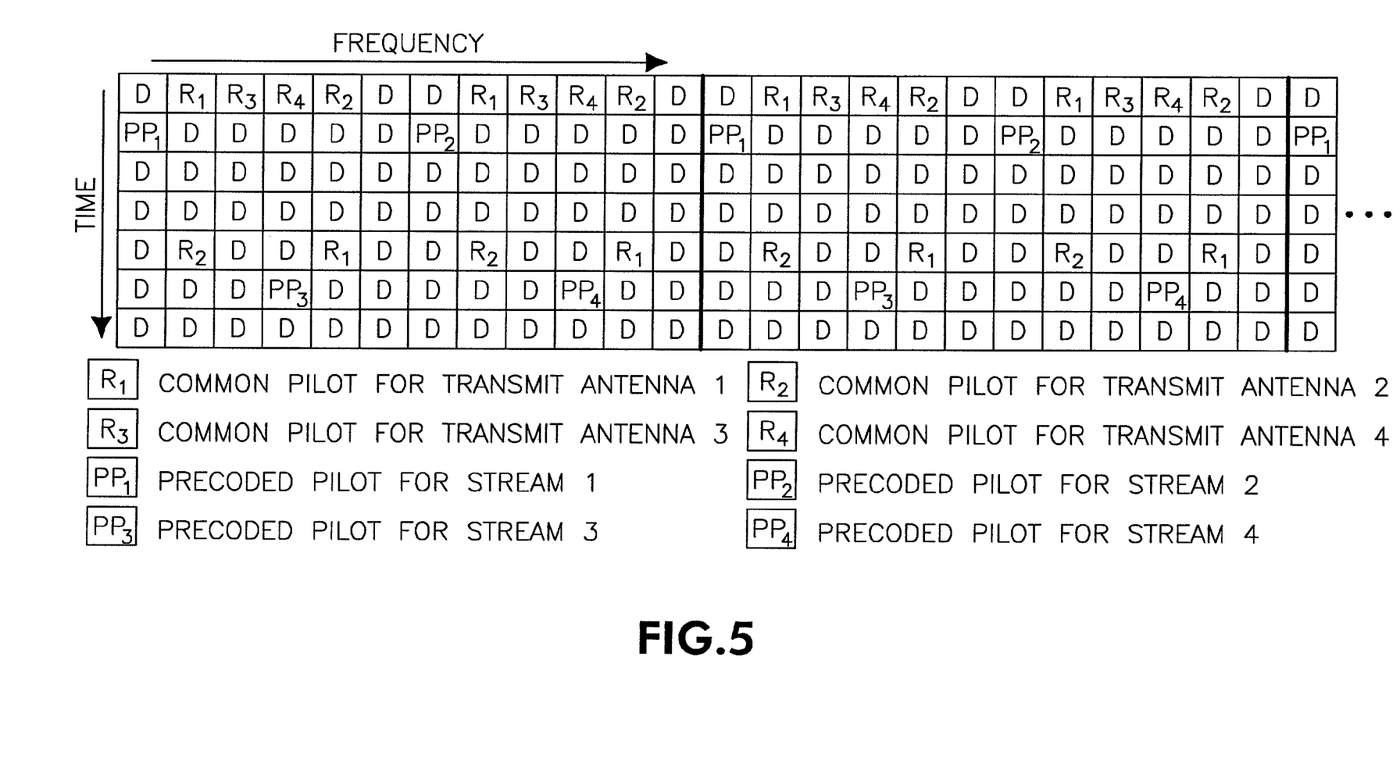
FIG. 5 shows another example layout of precoded pilot transmission using dedicated RS whereby precoded pilots are placed in different subcarriers and in different OFDM symbols.
Figure 6:
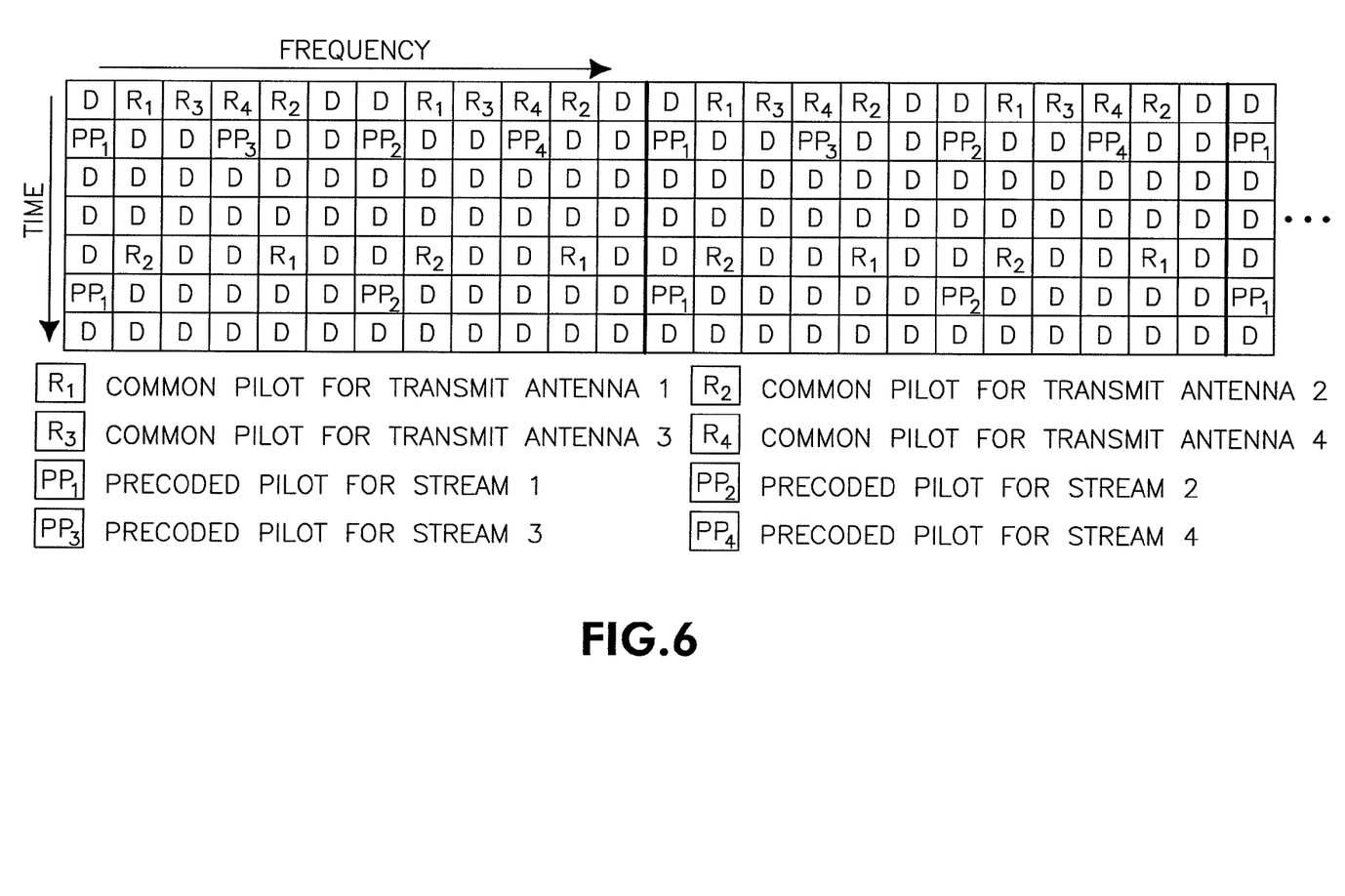
FIG. 6 shows another example layout of precoded pilot transmission using dedicated RS whereby precoded pilots are placed in different subcarriers, in the same OFDM symbols and repeated in different OFDM symbols.

The n-th element of the m-th precoded pilot in Equation 2 is transmitted using the n-th transmit antenna (for n=1, 2, . . . , N). The N elements of the same precoded pilot are transmitted from N transmit antennas in the same subcarrier and same OFDM symbol. Different precoded pilots are transmitted in different subcarriers and/or different OFDM symbols, as shown in FIGS. 4, 5 and 6, discussed below. FIG. 3 shows an example diagram depicting the disclosed precoded pilot transmission method, wherein each antenna transmits an element of the dedicated precoded pilot.

As stated above, the disclosed method includes the transmission of the precoded pilot using a dedicated RS, which are mapped to the resource. Each element of a precoded pilot in a single dedicated RS may be transmitted for each antenna port. The allocation of the dedicated RS has a fixed layout and is mapped to resource allocation. For example, in the case of two streams, dedicated RS (e.g., RS_x1 and RS_x2) have a fixed location associated with resource block RB#x, and dedicated RS (e.g., RS_y1 and RS_y2) have a fixed location associated with RB#y. The information of resource allocation is transmitted to WTRU 20 over a downlink control grant channel, which includes the resource allocation in time and frequency. WTRU 20, therefore, decodes the control channel to determine the location of the assigned resource(s). The location of the assigned resource(s) is mapped to the location of dedicated RS. For example, in the case of two streams, if RB#x is signaled and decoded, WTRU 20 should read the dedicated RS associated with RB#x, i.e., RS_x1 and RS_x2. If RB#y is signaled and decoded, WTRU 20 should read the dedicated RS associated with RB#y, i.e., RS_y1 and RS_y2.

As such, WTRU 20 retrieves the information for the precoded pilot in the allocated subcarrier(s).

It should be noted that, a dedicated RS in accordance with the disclosed method is transmitted for each layer or each data stream. In Single User MIMO the precoded pilots, are used for spatial streams or layers belonging to the same user. In Multiple User—MIMO the precoded pilots are used for data streams or layers belonging to different users.

FIG. 4 shows an example layout for the precoded pilots that are in different subcarriers but in the same OFDM symbol. In this example, $R_n$, n=1,2, . . . N, represents the common pilot for the n-th transmit antenna. $PP_m$, m=1, 2, . . . , M, represents the precoded pilot for the m-th layer or data stream. In the example shown in FIG. 4, N=4 and M=4. D represents either a data symbol or control channel.

As illustrated in the FIG. 4 example, the first OFDM symbol in time includes the common pilot signals for each of the n transmit antennas $R_1$, $R_2$, $R_3$, $R_4$. The second OFDM symbol in time includes each of the precoded pilots $PP_1$, $PP_3$, $PP_2$, $PP_4$ in subcarriers 1, 4, 7 and 10 allocated to the dedicated RSs, respectively. Common reference signals R1 and R2 are included in the fifth OFDM symbol in time, which allows for interpolation using the common reference signals $R_1$, $R_2$, $R_3$, $R_4$.

It should be noted that D may include data or a control channel. For example, in the first three OFDM symbols (i.e., first three rows in time in FIG. 4) a portion of the Ds can be control channels.

Another example layout is shown in FIG. 5, wherein the precoded pilots are in different subcarriers and in different OFDM symbols. In this example, $R_n$, n=1, 2, ... N, represents the common pilot for the n-th transmit antenna. $PP_m$, m=1, 2, ..., M, represents the precoded pilot for the m-th layer or data stream. In FIG. 5, the case of N=4 and M=4 is shown. Precoded pilots $PP_1$ and $PP_2$ are transmitted in the second OFDM symbol in time, and the remaining precoded pilots $PP_3$ and $PP_4$ are transmitted in the sixth OFDM symbol in time. This layout can achieve diversity. For example if the second OFDM symbol has deep fading, it can destroy the PP1 and PP2 while the fifth OFDM symbol may not have deep fading, and therefore, PP3 and PP4 can survive.

Another example layout is shown in FIG. 6, wherein the precoded pilots $PP_1$, $PP_3$, $PP_2$, $PP_4$ are included in the same OFDM symbol and repeated in the a different OFDM symbol in time. As shown in FIG. 6, $PP_1$, $PP_3$, $PP_2$, $PP_4$ are included in the second OFDM symbol in time and $PP_1$, $PP_2$ are repeated in the sixth OFDM symbol in time. This layout allows interpolation of the precoded pilots to be used.

As those having skill in the art should recognize, other layouts for precoded pilots that are in different combinations of subcarriers and OFDM symbols are possible. Also, precoded pilots for streams 1 and 2 can be denser than the precoded pilots for streams 3 and 4 if the cases of using streams 1 and 2 are more often. The locations of precoded pilots of streams can also be switched or changed.

As indicated above, effective channel estimation is essential to MIMO. Accordingly, a method for effective channel estimation using the precoded pilots transmitted by a dedicated reference signal is disclosed. WTRU 20 receives the OFDM block at receiver 126. Receiver 126 forwards the block to effective channel estimator 124 for estimating the effective channel. Once the effective channel is estimated, this information is used by demodulator 127 for demodulating the received data symbols and control channels included in the OFDM block.

Effective channel is estimated for each precoded pilot that is transmitted across all antennas. For example, if there are four antennas and two streams the received signal model for each dedicated pilot, m=1,2, and for N=4, can be expressed as:

$$\vec{y}_m = \begin{bmatrix} h_{11} & h_{12} & h_{13} & h_{14} \\ h_{21} & h_{22} & h_{23} & h_{24} \end{bmatrix} \begin{bmatrix} v_{m1} \\ v_{m2} \\ v_{m3} \\ v_{m4} \end{bmatrix} \cdot P_m + \vec{n}. \qquad \text{Equation (3)}$$

An $H_{\mathit{eff}}$ is the effective channel that represents the channel impulse responses with preceding effect. Equation (3), therefore can be expressed as:

$$H_{\mathit{eff}} = \begin{bmatrix} h_{\mathit{eff},11} & h_{\mathit{eff},12} \\ h_{\mathit{eff},21} & h_{\mathit{eff},22} \end{bmatrix}. \qquad \text{Equation (4)}$$

As such, effective channel in the case of four transmit antennas and two receive antennas (MIMO 4×2) can be estimated using the two precoded pilots using the following equations:

$$\vec{y}_1 = \begin{bmatrix} h_{\mathit{eff},11} \\ h_{\mathit{eff},21} \end{bmatrix} \cdot P_1 + \vec{n} \qquad \text{Equation (5)}$$

and $$\vec{y}_2 = \begin{bmatrix} h_{\mathit{eff},12} \\ h_{\mathit{eff},22} \end{bmatrix} \cdot P_2 + \vec{n} \qquad \text{Equation (6)}$$

The estimation of effective channel can be easily extended to N transmit antennas, M data streams with Z receive antennas. For example N=4, M=4 and Z=4.

Figure 7:
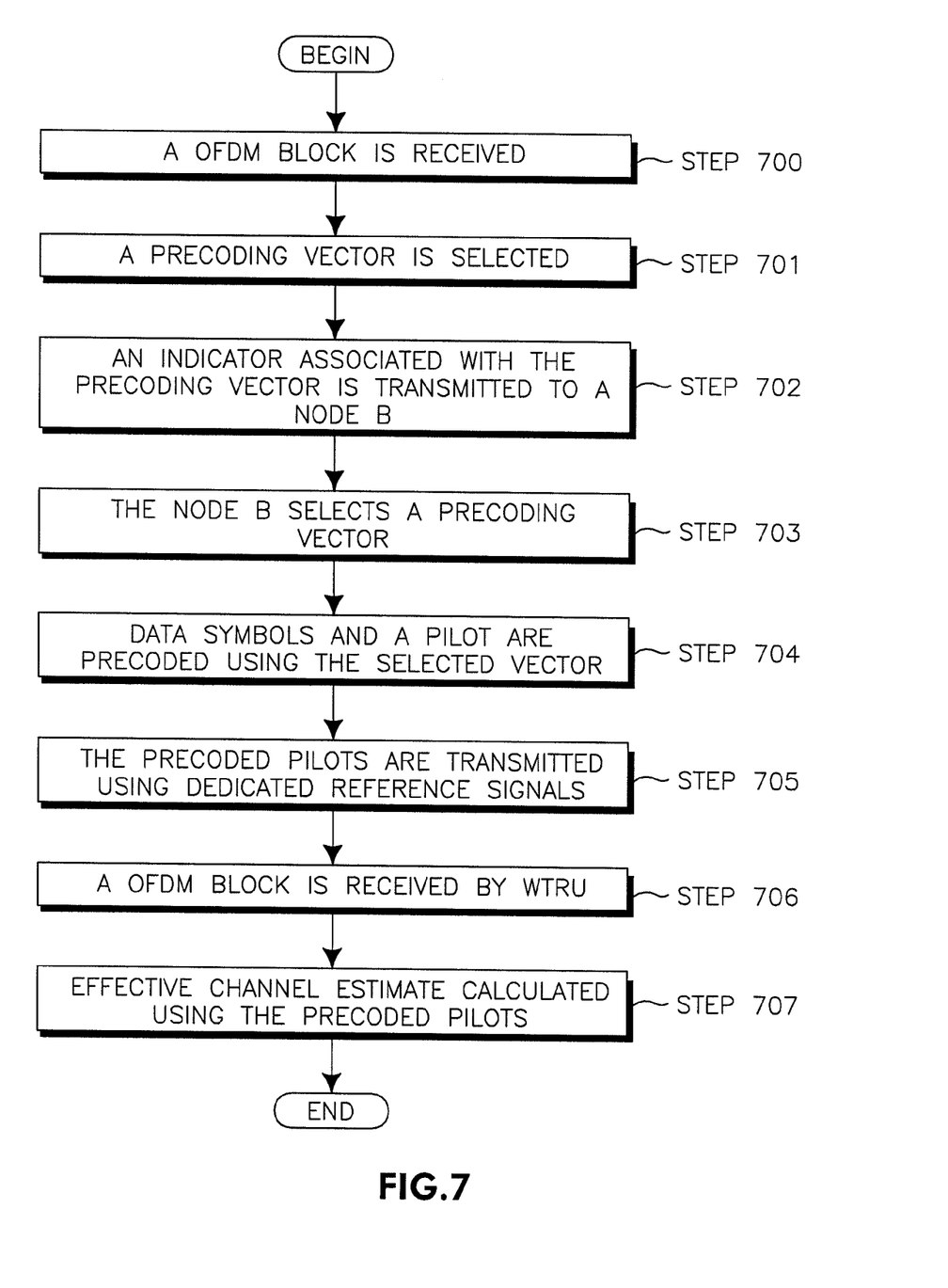
FIG. 7 shows a flow diagram of a method of effective channel estimation.

A flow diagram of the disclosed method of effective channel estimation using precoded pilots is illustrated in FIG. 7. WTRU 20 receives a OFDM block from Node B 30. (Step 700) Common reference signals $R_m$ for each transmit antenna are used by WTRU 20 to selects a precoding or vector from a codebook based on the channel state information derived from the common reference signals. (Step 701) An identifier, such as an index, associated with the selected precoding vector is transmitted to Node B 30. (Step 702)

Precoding vector determiner 115 of Node B 30 then selects a precoding vector either using the indicator transmitted from WTRU 20, or chosen based on other criteria. (Step 703) Once the preceding vector is selected by NodeB 30, the data symbols and a pilot signal for each transmit antenna are precoded using the selected preceding vector by precoding processor 117. (Step 704) The precoded pilot $PP_1 \ldots PP_m$ is transmitted to WTRU 20 using WTRU-specific dedicated reference signals of a transmitted OFDM block. (Step 705)

WTRU 20 receives the transmitted OFDM block including common reference signals, data symbols or control channels, and the precoded pilot signals for each transmit antenna in a subcarrier. (Step 706) Effective channel estimator 124 then estimates the effective channel for each data stream using the precoded pilot signals (Step 707), and WTRU 20 then demodulates the data symbols using estimated effective channel.

Figure 8:
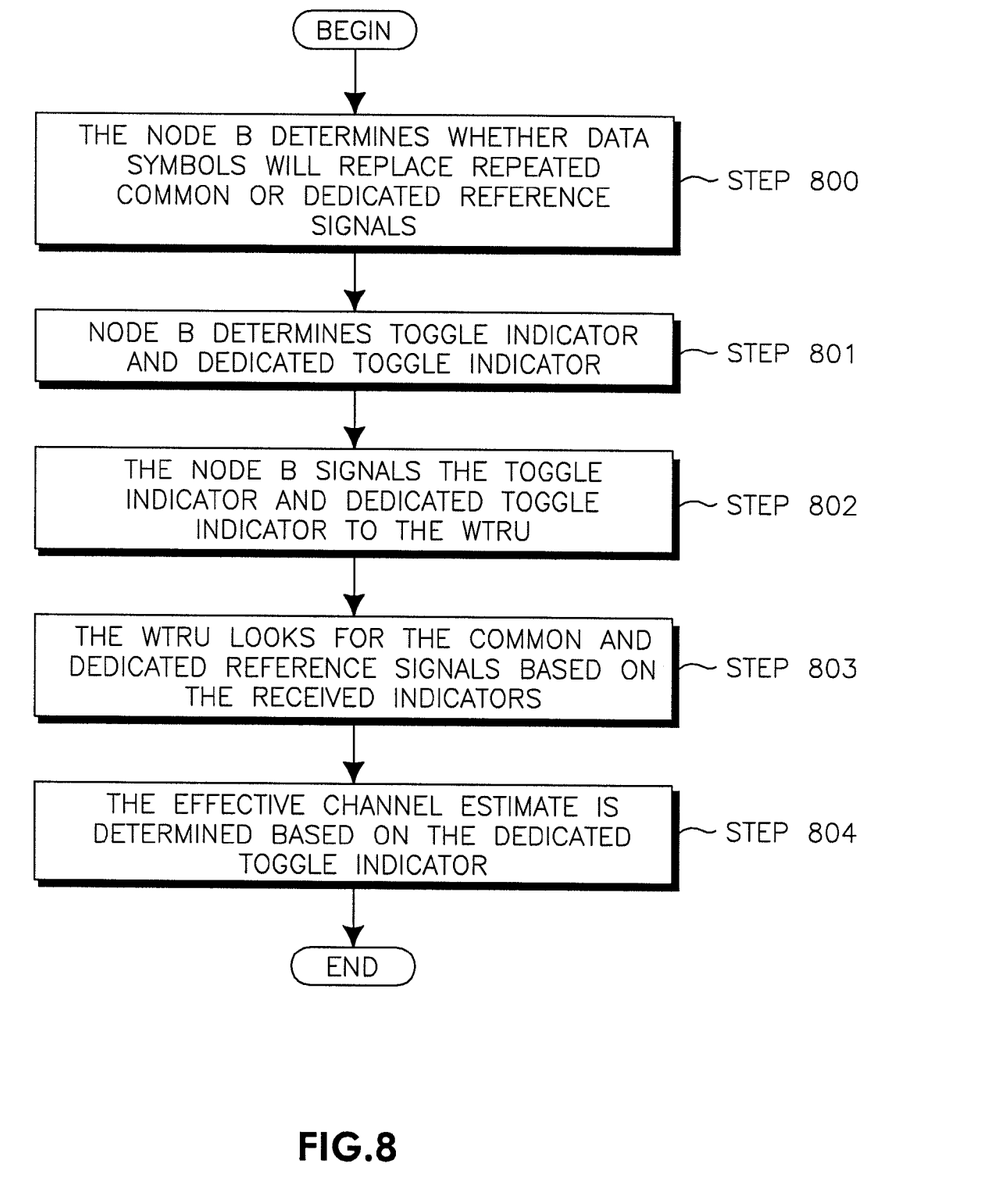
FIG. 8 shows a flow diagram of an alternative method of effective channel estimation.

An alternative method is disclosed wherein a portion of the common reference signal or precoded pilot signal may be eliminated in order to insert additional data into those subcarriers. In accordance with this alternative, a toggle indicator is transmitted to WTRU 20 in a L2/3 signaling, RRC signaling, high layer signaling or L1 control signaling, indicating that WTRU 20 should not expect to receive a portion of common reference signal (cell-specific reference signal) or a precoded pilot signal (WTRU-specific dedicated reference signal) in a determined OFDM symbol in time. WTRU would then expect to receive a data symbol instead. For example, during a high speed condition, Node B 30 transmits the toggle indicator (in the L2/3 signaling, RRC signaling, high layer signaling or L1 control signaling) informing WTRU 20 to look for reference symbols in the subcarriers where the common reference signal and precoded pilot symbol have been repeated in the OFDM signal. During a low speed condition, Node B 30 transmits the toggle indicator (e.g., in the L2/3 signaling, RRC signaling, high layer signaling or L1 control signaling) informing WTRU 20 to look for data symbols in the subcarriers where the common reference signal and precoded pilot symbol may have been repeated in the OFDM signal, or are not needed for efficiency reasons. In this case the data symbols replace the reference symbols where the cell-specific reference signal and WTRU-specific reference signal have been repeated. In addition a dedicated reference toggle indicator can be used to switch on and off the entire WTRU-specific reference signal, i.e., switching off the WTRU-specific reference signal when the dedicated reference signal is not needed and switch on the WTRU-specific reference signal when they are needed. The signaling of the dedicated reference toggle indication can be done semi-statically via a high layer signaling, such as L2/3 signaling, or radio resource control (RRC) signaling for reduced overhead. The signaling of RS layout can also be done dynamically via a layer 1 control signaling for fast adaptation. The toggle indicator and the dedicated reference toggle indicator can also be combined into one 2-bit or N-bit indicator for any proper applications. The toggle indicator or dedicated reference toggle indicator can also be generalized into an indicator that has Q bits where Q>1.

A flow diagram illustrating this alternative method is shown in FIG. 8. Node B 30 determines whether WTRU 20 is to look for the common reference signal, the dedicated reference signal and whether a dedicated reference signal should be expected at all. (Step 800) Once Node B 30 determines each of these, the toggle indicator and dedicated reference toggle indicator are transmitted to WTRU 20 in accordance with the determination. (Step 801) WTRU 20 receives the toggle indicator and dedicated reference toggle indicator. (Step 802) When WTRU 20 receives that OFDM block, WTRU 20 reads the information in each subcarrier based on each of the received toggle indicators. (Step 803) Effective channel estimator 124 then determines the effective channel estimate based on the received dedicated reference toggle indicator. (Step 804).

It should be noted that the determination made by transmitter 30 regarding the toggle indicator and dedicated reference toggle indicator may be conducted in preceding processor 117 or in precoding vector determiner 115. This determination may also be made in a separate toggle processor included in transmitter 110 (or Node B 30).

Another method is disclosed wherein a certain number of layouts for WTRU-specific reference signal are used. In this method, NodeB 30 decides a particular layout of WTRU-specific reference signal. An indicator of the selected layout of WTRU-specific reference signal is then signaled to WTRU 20 via L2/3 signaling, RRC signaling, high layer signaling or control channel, indicating that WTRU 20 should expect to receive a particular layout for common reference signal (cell-specific reference signal) and a precoded pilot signal (WTRU-specific dedicated reference signal). For example if the layouts in FIGS. 4, 5 and 6 are labeled as layout A, B and C respectively, NodeB 30 can select one layout among layouts A, B and C and signal the selected layout to WTRU. In this example 2 bits can be used to represent the selected one layout among three possible layouts. The signaling of RS layout indication can be done semi-statically via a high layer signaling such as L2/3 signaling or RRC signaling for reduced overhead. The signaling of RS layout can also be done dynamically via a layer 1 control signaling for fast adaptation.

Figure 9:
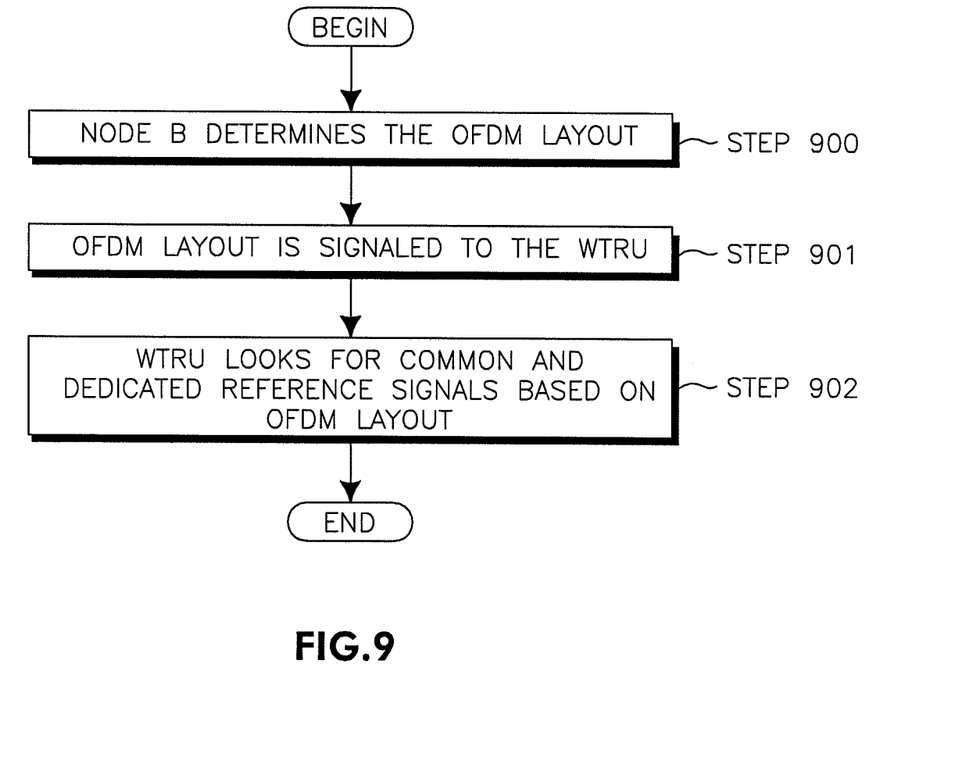
FIG. 9 shows a flow diagram of a method of transmitting an OFDM layout for effective channel estimation.

A flow diagram of this disclosed method is shown in FIG. 9. Node B 30 determines which one of a plurality of OFDM block layouts will be used for transmission to WTRU 20. (Step 900) Once Node B 30 determines the OFDM layout, a layout indicator is signaled to WTRU 20. (Step 901) Based on the layout indicator received from Node B 30, WTRU 20 looks for a common reference signal and dedicated reference signal in the subcarriers allocated within the appropriate OFDM layout. (Step 902)

It should be noted that the selection of the OFDM layout can be conducted by precoding processor 117 or precoding vector determiner 115. This selection may also be made in a separate layout processor included in transmitter 110 (or Node B 30).

The precoded pilots can also replace some of the common pilots to reduce the overall pilot overhead. The optimum layout can be determined based on the trade-off between performance and pilot overhead. The precoded pilots can be hopped or coordinated between cells to mitigate or remove inter-cell interference. The precoded pilots can also be multiplied with phases, cyclic shift codes, scrambling codes, CAZAC sequences or the likes to mitigate or reduce inter-cell interference.

The disclosed method may be applied to both single user (SU) and multi-user (MU) MIMO systems for evolved UTRA, and may be applied to downlink (DL) MIMO communications as well.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use by a base station in a wireless orthogonal frequency division multiplexing (OFDM) system using a plurality of antenna ports, wherein reference symbols facilitate channel estimation at a wireless transmit/receive unit (WTRU), the method comprising:
   determining a resource allocation for the WTRU,
   wherein the resource allocation indicates a number of subcarriers assigned to the WTRU for an OFDM block, and wherein the OFDM block being divided into sub-blocks defined by subcarriers and symbol time intervals;
   for each antenna port of the base station, in the OFDM block, transmitting data of at least one stream, antenna specific reference symbols of that antenna port and for each stream, precoded reference symbols, wherein for each antenna port, the antenna specific reference symbols are not in a same sub-block as the antenna specific reference symbols of another antenna port;

wherein for each stream, the precoded reference symbols of that stream are included in a plurality of sub-blocks having different symbol time intervals and same subcarriers, wherein for at least one stream, the precoded reference symbols of that stream are included in a plurality of sub-blocks having different subcarriers and a same symbol time interval, and wherein the sub-blocks used for the antenna specific reference symbols and the precoded reference symbols are determined based on at least the resource allocation; and transmitting information indicating whether the precoded reference symbols for each stream are included in each stream.

2. The method of claim 1 wherein the precoded reference symbols of each data stream are not transmitted in a same sub-block as the antenna specific reference symbols of any of the antenna ports.

3. The method of claim 1 wherein the precoded reference symbols of each stream are derived from a scrambling code.

4. The method of claim 1 further comprising transmitting an indication of the resource allocation to the WTRU using a control channel.

5. The method of claim 4 wherein the control channel is included in at least a first transmitted OFDM symbol of the OFDM block.

6. The method of claim 1 wherein for each stream, sub-blocks of the same subcarriers having the precoded reference symbols of that stream have data in the OFDM block.

7. The method of claim 1 wherein the at least one stream is a plurality of streams.

8. The method of claim 1, wherein the base station selectively uses the precoded reference symbols for each stream.

9. A method for use by a base station in a wireless orthogonal frequency division multiplexing (OFDM) system using a plurality of antenna ports, wherein reference symbols facilitate channel estimation at a wireless transmit/receive unit (WTRU), the method comprising:

determining a resource allocation for the WTRU, wherein the resource allocation indicates a number of subcarriers assigned to the WTRU for an OFDM block, and wherein the OFDM block being divided into sub-blocks defined by subcarriers and symbol time intervals;

for each antenna port of the base station, in the OFDM block, transmitting data of at least one stream, antenna specific reference symbols of that antenna port and for each stream, precoded reference symbols, wherein for each antenna port, the antenna specific reference symbols are not in a same sub-block as the antenna specific reference symbols of another antenna port;

wherein for each stream, the precoded reference symbols of that stream are included in a plurality of sub-blocks having different symbol time intervals and same subcarriers, wherein for at least one stream, the precoded reference symbols of that stream are included in a plurality of sub-blocks having different subcarriers and a same symbol time interval, and wherein the sub-blocks used for the antenna specific reference symbols and the precoded reference symbols are determined based on at least the resource allocation, wherein the base station selectively uses the precoded reference symbols for each stream; and transmitting information indicating whether the precoded reference symbols for each stream are included in each stream.

* * * * *